TWO-CHANNEL AMPLIFIER SYSTEM WITH DIFFERENTIAL OUTPUT FOR A THIRD SPEAKER

Filed Dec. 4, 1967

2 Sheets-Sheet 1

INVENTOR
ALAN B. WELSH
RICHARD M. HEBEISEN
MATHEW A. SLAATS
BY [signature]

INVENTOR
ALAN B. WELSH
RICHARD M. HEBEISEN
MATHEW A. SLAATS
BY Melvin A. Crosby

United States Patent Office 3,497,604
Patented Feb. 24, 1970

3,497,604

TWO-CHANNEL AMPLIFIER SYSTEM WITH DIFFERENTIAL OUTPUT FOR A THIRD SPEAKER

Alan B. Welsh, Richard M. Hebeisen, and Mathew A. Slaats, Jasper, Ind., assignors to Jasper Electronic Mfg. Corp., Jasper, Ind., a corporation of Indiana Filed Dec. 4, 1967, Ser. No. 687,704
Int. Cl. H04r *5/04;* G10h *1/00;* H03f *3/68*
U.S. Cl. 84—1.01 20 Claims

ABSTRACT OF THE DISCLOSURE

Method and apparatus for the amplification and transducing of multiple frequencies supplied on two channels in which an amplifier and speaker is provided for each channel and in which a third speaker is connected across the output sides of said amplifiers and a particular range of frequencies is split and supplied to the amplifiers as equal and opposite signals to the input sides for energizing the third speaker and with selective filters in series with each speaker.

This invention relates to amplifying systems and is particularly concerned with an amplifier system in which three speakers means are powered by means of only two amplifiers with one of the speaker means being supplied with signals differing in frequency from the signals supplied to the other speaker means.

In the art of sound reproduction, it is always attempted to reproduce sounds as near the original sound as possible, and it is furthermore attempted, with more refined sound reproducing systems, to create a spatial effect which serves to enhance the quality of the reproduced sound. In the reproduction of sounds from stereo recordings, the sound is originally recorded by means of two channels and is then reproduced by means of two channels, each of which has its own amplifier and speaker means. By arranging the speaker means in spaced relation, substantially approximating the relative positioning of the pick-up or microphone means employed during the recording, a spatial effect can be produced when a record is played that fairly closely simulates the original conditions at the time that the sound was recorded. It will be understood that more than two channels, up to as many as desired, could be employed for the recording and reproducing of the sound, but in the manufacture of wax records two channels represent a practical limitation while in the art of recording on magnetic tape, it might be possible to have as many as four channels for recording and reproduction. In every case, however, each channel in the reproducing mechanism has its own amplifier and its own speaker means.

Another situation in which amplifiers and speaker means are employed is in connection with electric or electronic organs, or in connection with amplifiers for individual musical instruments. In the case of electric or electronic organs, it is customary to employ two speaker means and two amplifiers, one for each speaker means, with the lower notes drawn particularly from the pedal clavier being passed through the one of said amplifiers and speaker means constructed most suitably therefor. It is not ordinarily attempted in respect of electric or electronic organs, although it may be done, to provide a separate amplifier and speaker means for the bass notes produced by the pedal clavier.

Other musical instruments will, of course, produce frequencies varying widely in range and it will become apparent that the present invention is also adapted for use in connection therewith.

The present invention, in brief, proposes a novel arrangement in which a speaker means, having no amplifier pertaining specifically thereto, can be energized from the outlet sides of amplifier means pertaining to other speaker means and without any detriment to the signal supplied to the said other speaker means.

With the foregoing in mind, it is a primary object of the present invention to provide an amplifier system in which a plurality of sound producing speaker means can be energized by one less amplifier than is ordinarily employed therefor.

Another object of the present invention is the provision of an amplifying circuit and a method of amplifying signals in which a low frequency speaker means can be energized from the outputs of a pair of amplifiers pertaining to higher frequency speaker means and without interfering with the higher frequency signal to the higher frequency speaker means.

Still another object of the present invention is a method of and an apparatus for producing strong bass notes from a bass speaker which is powered by the amplifiers pertaining to other and higher frequency speakers.

Figure 1:
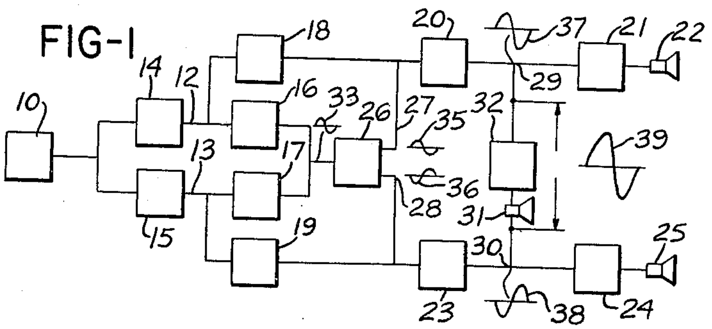
FIGURE 1 is a schematic representation of the present invention as applied to a stereo system and with all of the elements shown in block form.

In the are of sound reproduction it is desirable, as mentioned, to reproduce sounds as nearly free of distortion as possible. In a stereo system, for example, it is desirable to reproduce both the higher frequencies and the lower frequencies substantially free of distortion. To produce sounds free of distortion requires ample audio power to reproduce the peak demands of the bass sounds which are the most demanding of the frequencies to reproduce free of distortion.

In a two-channel stereo system, matched speakers are required so that both thereof can reproduce the lower frequencies as well as the higher frequencies. As mentioned above, it is more difficult properly to reproduce the bass frequencies and more costly equipment is required so that for a high quality stereo installation it becomes necessary to have two costly speakers. As will be seen hereinafter, the present invention not only provides for a third channel of reproduction from two channels of supply in a stereo system, but only a single large expensive bass speaker is required and this is even less expensive than the matched speakers referred to above because it does not have to produce the higher sound frequencies.

A characteristic of a high quality sound amplifying system is that there is negligible hum generated in the power supply. It is known that a push-pull output stage in such an amplifying system helps to reduce or cancel out the hum from a properly matched DC supply source, but the best known and most satisfactory method of providing for low hum in the output is to use large storage capacitors.

As will be seen hereinafter, in the system according to the present invention, only one amplifier system is connected to a speaker which will reproduce the hum frequencies and, furthermore, this amplifier system is so connected that the residual hum of the DC supply is cancelled out before it reaches the speaker. Thus, a low hum audio system can be constructed using small and relatively inexpensive storage capacitors in the power supply system.

It is well known, in the reproducing of the musical spectrum, that substantial power is necessary for handling the peak bass demands while a much lower power can be employed to reproduce middle frequencies and high frequencies. With a conventional two-channel stereo amplifier, it is necessary for the entire amplifier system to be designed to provide the high power necessary for the reproduction of the bass frequencies and this power is, of course, never fully utilized in the reproduction of the middle and higher frequencies. As will also be seen hereinafter, the present invention provides a novel system in which sufficient power is available for reproducing the bass frequencies, while however, the amplifiers are not greatly over-sized for handling the middle frequencies and the high frequencies as has been the case with high quality stereo systems heretofore.

It is also known in sound reproducing systems that the power output of the system is proportional to the voltage range in which the system operates. Thus, a device to produce a large power output, must be capable of sustaining correspondingly large voltage variations. The expense of devices capable of producing high power is naturally substantially higher than the cost of devices which produce smaller amounts of power. It will also be seen hereinafter that the present invention provides an amplifier system capable of relatively high power output for the production of bass frequencies while, at the same time, employing devices with voltage ratings that would normally produce a much lower power output.

In the adaptation of the present invention to an electric or elecrtonic organ, three channels are encountered rather than two channels as referred to in connection with stereo systems as discussed above. Such an electric or electronic organ is provided with an upper or solo manual or swell organ portion, a lower or accompaniment manual or great organ, and a pedal clavier. Each of the aforementioned portions or sections of the organ is voiced in a particular manner and thus each said section has a separate family of voices. The generation of the basic tone frequencies in such an organ, and the shaping of the wave forms from the frequency sources to produce the individual voices referred to, are well known and are not disclosed in detail in the present application.

Among the class of electronic organs some thereof have a tremulant producing speaker in which the speaker rotates, or a baffle rotates, so as to produce a tremulant sound effect. Such a tremulant producing speaker can handle the middle frequencies and high frequencies, but does not do at all well in respect of producing bass frequencies. Thus, when a tremulant producing speaker is provided with an organ of the nature referred to, it is necessary, for proper sound effects, also to provide another main speaker system to which the tones from the pedal clavier are routed. It is also often the case that the main speaker system is called upon to reproduce tones from either or both of the manuals of the organ, and when all three sections of the organ are thus routed to the main speaker system, a large and expensive speaker is required. Furthermore, when manual tones together with pedal tones are supplied to the main speaker system, particularly in loud volume levels, the maximum power level that can be produced is limited by the pedal tones.

It is important, however, to have ample volume for the pedal tones while having clear and undistorted tones from the manuals. If the main speaker system of the organ is called upon to handle tones from both the pedal clavier and one or both of the manuals, there is often distortion of the manual tones brought about by the substantial movements of the speaker parts as brought about by the bass tones being produced, particularly as mentioned, at loud volume levels.

As will be developed hereinafter, the present invention provides a simple and relatively inexpensive highly effective manner in which separation of the pedal clavier and manual-produced tones is provided so that the pedal tones can be produced in an individual speaker while at the same time an amplifier is provided for driving a tremulant producing speaker.

Referring now to the drawings somewhat more in detail, in FIGURE 1, reference numeral 10 indicates a stereo program source which may be a record or a tape. The program source 10 provides two channels 12 and 13 which are derived from the pre-amplifier stages 14 and 15 and which may also comprise tone and volume control devices and the like. Each of the two channels 12 and 13 supplies a respective low pass filter 16, 17, and a respective high pass filter 18, 19. High pass filter 18 supplies the input side of a power amplifier 20, the output side of which is connected through another high pass filter 21 to a speaker 22 adapted, in particular, for reproducing middle and high frequencies.

High pass filter 19 is similarly connected to the input side of an amplifier 23, the output side of which is connected through another high pass filter 24 with another speaker 25 adapted, in particular, to reproduce middle and high frequencies.

According to the present invention, the respective outputs from the low pass filters 16, 17 are connected to the input of a phase splitter 26 which has two outputs 27 and 28. The signals produced at the outputs 27 and 28 are equal to each other but are 180° out of phase. Output 27 is connected to the input of amplifier 20 and output 28 is connected to the input of amplifier 23. The portions of the outputs of amplifiers 20 and 23, due to the inputs 27, 28, are out of phase with each other so that the voltage impressed across the branch which consists of bass speaker 31 and low pass filter 32 in series therewith, is the sum of the respective portions of the outputs of amplifiers 20 and 23 due to the outputs 27 and 28 from phase splitter 26. This will be more evident upon reference to the diagrammatically illustrated wave forms shown in FIGURE 1.

In FIGURE 1 the wave form at 33 represents the input to phase splitter 26. Wave form 35 represents the output at output 27 of phase splitter 26. The wave form at 36 indicates the output at output 28. It will be noted that wave forms 35 and 36 are 180° out of phase with each other. The wave form indicated at 37 is representative of that part of the output from amplifier 20 which is due to the input from output 27 of phase splitter 26. Similarly, the wave form at 38 represents the portion of the output from amplifier 23 which is due to the input thereto from output 28 of phase splitter 26. The effective voltage standing across speaker 31 and low pass filter 32 is then represented by the wave form at 39 which represents the sum of the voltages at 37 and 38. It will be understood that the wave forms illustrated are merely exemplary as is likewise the degree of amplification accomplished in the respective amplifiers.

High pass filter 21 pertaining to speaker 14 permits only middle and high frequencies to pass to said speaker. Similarly, high pass filter 24 permits only the middle and high frequencies to pass to speaker 25. On the other hand, low pass filter 32 permits only low frequencies to pass to speaker 31. The low frequency inputs to the amplifiers 20 and 23 from phase splitter 26 thus do not have any substantial influence on speakers 24 and 25 and, similarly, the middle and high frequency inputs to amplifiers 20 and 23 from high pass filters 18 and 19 have no substantial effect on speaker 31. It will be appreciated that within a certain limited frequency range, certain frequencies will pass to both speakers 22 and 25 and to speaker 31. However, this is within a very limited range and the effect of the sound reproduction is not noticeable because substantially the same volume of sound continues to be produced. At frequencies below the above-mentioned limited range of frequencies, and which might be termed the cross-over point, substantially all of the lower frequencies pass to speaker 31, whereas at frequencies above the said cross-over point, substantially all of the frequencies pass to speakers 22 and 25.

From the foregoing it will be apparent that two input channels and two amplifiers are operable for powering three speakers with the third speaker producing only the bass tones. The advantage of the arrangement is in the spatial effect obtained and also in the reduction in size of amplifiers 20 and 23 from what would they have to be if either supplied bass speaker 31 directly. It will also be appreciated that substantial power is available for bass speaker 31 and, in fact, the power available for this speaker is substantially four times the power that would be derived from the output of either amplifier directly.

It will further be appreciated that speaker 31 can be designed specifically for the production of the bass notes and need not be designed for the production of the middle or higher frequency tones. Speaker 31 can thus be made more inexpensively than has heretofore been possible and also can be designed to be a higher quality speaker than has been possible heretofore because it has a single purpose. Similarly, speakers 22 and 25 need not be designed to produce the base frequencies and thus are less costly than has heretofore been possible. Still further, the production of bass tones in 31, even at large volume, will not distort the tones from speakers 22 and 25 as has been the case heretofore when a single speaker was required to produce not only bass frequencies but also middle and high frequencies as well.

Figure 2:
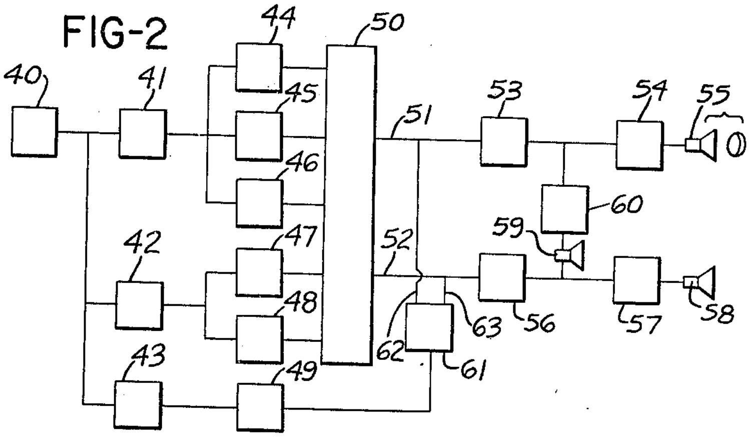
FIGURE 2 is a view like FIGURE 1, but shows the present invention in block form as applied to an electric or electronic organ.

FIGURE 2 shows the present invention as adapted to an electric or electronic organ. In FIGURE 2, reference numeral 40 indicates a tone generating source which supplies the frequencies for the solo manual keyboard 41, for the accompaniment manual keyboard 42 and for the pedal keyboard or clavier 43. As is well known in the art, each of the keyboards has voicing circuits associated therewith for shaping and otherwise modifying the wave form of the frequencies supplied from source 40. For example, associated with solo keyboard 41 may be the voicing circuits 44, 45 and 46. Associated with the accompaniment keyboard 42 may be the voicing circuits 47 and 48. Also, the pedal clavier may have its own voicing circuits and these are illustrated at 49.

The voicing circuits from the solo and accompaniment keyboards are routed through a conventional circuit arrangement at 50 wherein the voices are combined and the respective voice families are routed to respective channels 51 and 52. Channel 51 is connected to the input side of amplifier 53, the output side of which is connected through a high pass filter 54 with a speaker 55 which may be, for example, a tremulant speaker.

Channel 52 is similarly connected through an amplifier 56 and a high pass filter 57 with a speaker 58 which may comprise the main speaker of the organ.

In a branch connected between the output sides of amplifiers 53 and 56 is a bass speaker 59 and a low pass filter 60 in series therewith.

The output from the voicing circuits 49 pertaining to the pedal clavier is conveyed to the input side of a phase splitter 61 which has a first output 62 supplying signals to the input side of amplifier 53, and a second output 63 supplying signals to the input side of amplifier 56. As already described in connection with FIGURE 1, the outputs at 62 and 63 from phase splitter 61 are opposite in phase to each other and equal in strength. This results in the production of out of phase signals at the output side of amplifiers 53 and 56, which, again as explained in connection with FIGURE 1, supply ample power to the branch containing the bass speaker 59.

Due to the branch extending from the output of one amplifier to the output of the other amplifier in FIGURES 1 and 2, the hum frequency voltages at the separate amplifier outputs are in phase and cancel through the bass speaker and there is substantial reduction in the hum frequency in the speakers for the middle and higher frequencies because of the high pass filters in series with these respective speakers. This permits the power supply system to be made at less cost than has heretofore been possible because it is not necessary to provide expensive filtering components therein to eliminate the hum output of the entire system.

It will also be noted that the supply voltage in the system is only that necessary to supply the higher frequency speakers. By the novel circuit arrangements of the present invention, four times the power is produced for the bass speaker as would normally be the case. The current ratings of the amplifiers must, of course, be double what would normally be calculated but the voltage rating does not need to be increased. Most amplifiers are substantially over-designed and with the usual amplifier no change is necessary in order to employ it in connection with the system of the present invention.

Other advantages that obtain from the practice of the present invention come about because two large expensive full range matched loud speakers are not necessary as are required according to the prior art. The system of the present invention permits the use of one large speaker cabinet for the bass speaker which can, for example, be recessed in a wall and thus eliminate the expensive cabinet work that is ordinarily employed in connection with high quality speaker systems. The middle and high frequency speakers, on the other hand, since they do not carry the lower frequencies, can be mounted in smaller, less expensive cabinets and this permits placement thereof according to individual taste at no sacrifice in the quality of the sound reproduced.

Balancing of the power supplied to various speakers can easily be accomplished according to well known practices in the art. For example, if the middle and higher frequency speakers are matched and the amplifiers are balanced, the power supply to the bass loudspeaker can readily be taken care of by the provision of a potentiometer in the input side of the phase splitter which supplies the two amplifiers.

Figure 3:
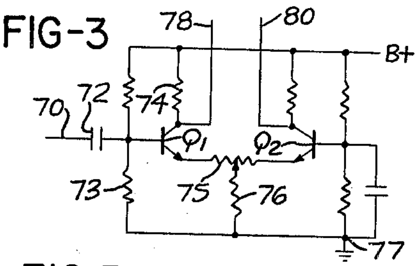
FIGURE 3 is a view showing a phase splitter of more or less conventional design, but forming an important element in the system of the present invention.

In order to more fully explain and disclose the present invention, FIGURE 3 shows more in detail the phase splitter which is identified at 26 in FIGURE 1, and at 61 in FIGURE 2. The phase splitter has an input connection at 70 so that a signal passing through capacitor 72 develops a voltage across resistor 73 in the base emitter circuit of a transistor Q1 so that current will flow from a B+ source through a resistor 74 and the emitter collector circuits of the transistor and a voltage divider 75 and a resistance 76 to a ground point 77. This current flow through the transistor will develop a signal at the output line 78. This output is opposite in phase to the input signal at input 70 and may be equal in amplitude. The other transistor Q2 is oppositely influenced and produces a signal at output 80 which is equal in amplitude and opposite in phase to the output at output 78. In this manner the signal from the phase splitter is prepared for the two amplifiers. FIGURE 3 shows only one type of phase splitter that could be used, several other types being known. Those skilled in the art will be able to evaluate the particular circuits and make proper selections.

Figure 4:
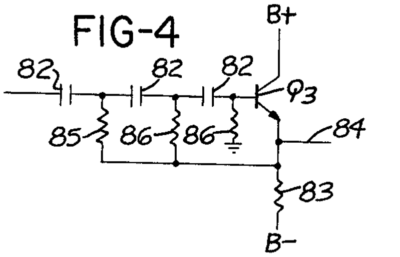
FIGURE 4 shows a high pass filter of substantially conventional construction, but also forming an important element of the system of the present invention.

FIGURE 4 shows schematically one form of a high pass filter such as is shown at 18, 19, 21, 24 in FIGURE 1. In FIGURE 4 it will be noted that capacitors 82 are disposed in the line leading to the base of transistor Q3, the collector of which is connected to the B+ line while the emitter of which is connected via a resistance 83 with the B negative supply. Line 84 on the emitter side of resistance 83 forms the output line from the high pass filter. Resistances 85 and 86 complete the high pass filter.

Figure 5:
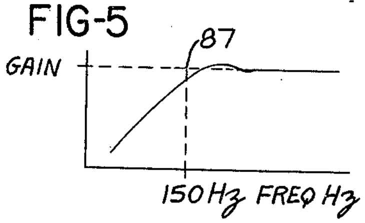
FIGURE 5 is a graph showing the response of the high pass filter of FIGURE 4 as the frequency supply thereto changes.

FIGURE 5 will show that the high pass filter has a fast roll off below the cross-over point at 87 and substantially constant characteristics above the cross-over point. Other high pass filters of different designs could, of course, be used.

Figure 6:
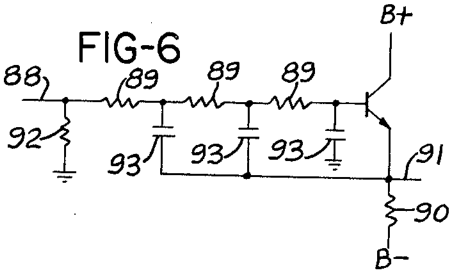
FIGURE 6 is a view similar to FIGURE 4, but showing a low pass filter.

In FIGURE 6 is shown a low pass filter in which the input line 88 is connected via resistances 89 with the base of a transistor Q4, the collector of which is connected with the B positive terminal and the emitter of which is connected via a resistance 90 with the B negative terminal. The emitter side of resistance 90 is connected to the output line 91. A resistance 92 between the input line 88 and ground, and capacitors 93 complete the low pass filter.

Figure 7:
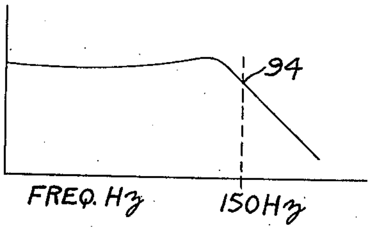
FIGURE 7 is a view like FIGURE 5, but showing the response of the low pass filter of FIGURE 6 as the frequency supply thereto varies.

FIGURE 7 will show that the low pass filter of FIGURE 6 has fast roll off above the cross-over point 94 which is indicated at the same frequency, namely 150 Hz. as the cross-over point in FIGURE 5, and that below this cross-over point the filter has substantially constant characteristics.

The high and low pass filters shown represent prior art circuits. The choice of filter designs is dependent upon several factors, some being rate of roll-off desired, losses allowed and cost.

High pass filters 21 and 24 in FIGURE 1, and 54 to 57 in FIGURE 2 are typically cross-over capacitors to react with the impedance of the respective connected loudspeaker to create a desired cross-over point. The rate of roll-off may be designed into the system by the choice of filter design.

In a similar manner, low frequency filters 32 and 60 in FIGURES 1 and 2 respectively, are typically inductors to pass low frequency current to the respective bass loudspeaker. The inductor reacts with the impedance of the connected loudspeaker to create the desired cross-over point. The desired rate of roll-off may be achieved by the choice of a low frequency filter design.

Figures 8, 12:
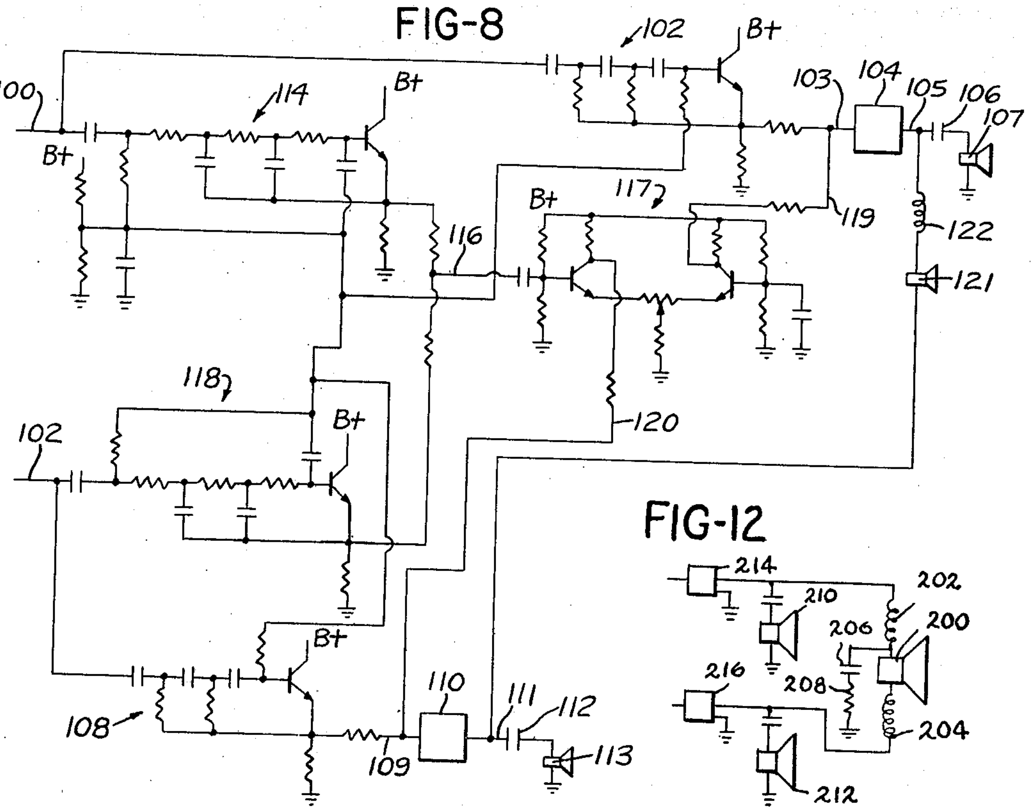
FIGURE 8 is a schematic wiring diagram illustrating more in detail the adaptation of the present invention to a stereo system.
FIGURE 12 shows a modification.

FIGURE 8 shows more in detail the circuit described in FIGURE 1. In FIGURE 8, 100 represents one of the stereo inputs and 102 represents the other thereof. Input 100 is connected through the high pass filter 102 with the line 103 forming the input side of amplifier 104, while the output side of the amplifier is connected by line 105 through a condenser 106, or other high pass filter, with the middle and high frequency range speaker 107.

Similarly, input line 102 is connected through a high pass filter 108 with line 109 forming the input side of amplifier 110 and the output side of which is connected to wire 111 leading through condenser 112 or other suitable high pass filter arrangement to another middle or high frequency range speaker 113.

Input line 100 is also connected through a low pass filter 114 with a wire 116 forming the input to the phase splitter 117. Input line 102 is also connected through a low pass filter 118 with line 116 for also supplying phase splitter 117. Phase splitter 117 has a first output 119 connected with wire 103 and a second output 120 connected with wire 109. As has been explained heretofore, the outputs on wires 119 and 120 are equal in amplitude but opposite in phase and serve to provide a voltage across the branch including the bass speaker 121 and an inductance or other suitable low pass filter 122 in series therewith.

Figures 9, 11:
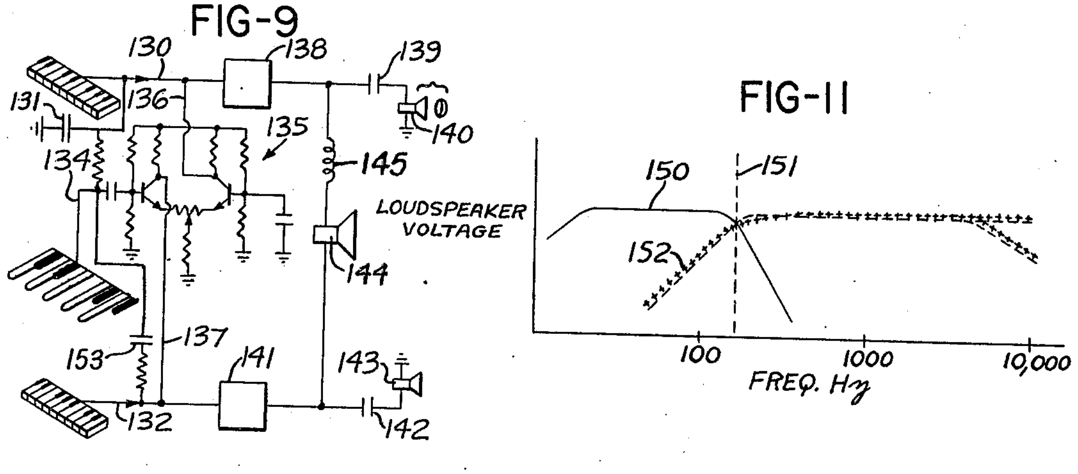
FIGURE 9 is a view like FIGURE 8, but shows the present invention adapted to an electric or electronic organ.
FIGURE 11 is a graph showing the terminal voltages at the bass speaker of FIGURES 8 and 9 and at the higher frequency speakers pertaining to the separate amplifiers.

FIGURE 9 shows the invention adapted to an electric organ according to FIGURE 2, with parts of the circuit somewhat more in detail. In FIGURE 9 the swell manual supplies signals to wire 130 while the accompaniment manual supplies signals to wire 132 and the pedal clavier supplies signals to wire 134. Wire 134 is connected to a phase splitter 135 which supplies a first signal to wire 136, and a second signal equal in amplitude and opposite in phase to a wire 137. Wires 130 and 136 are connected to the input side of an amplifier 138, the output side of which leads through a condenser or other high pass filter 139 to a middle and high frequency speaker, which may be of a tremulant type, as indicated by the symbol adjacent thereto.

Wires 132 and 137 lead to the input side of an amplifier 141, the output side of which is connected to a condenser or other high pass filter 142 with a main middle and high frequency speaker 143. As before, a bass speaker 144 is connected between the terminals of amplifiers 138, 141 and in series with an inductance 145 or other suitable low pass filter.

In FIGURE 9, low pass filter 131 may connect wire 130 to wire 134 so as to transfer low tones from the upper manual to the phase splitter 135. Further, high pass filter 153 may connect wire 134 to wire 132 so the higher tones from the pedal clavier are supplied to amplifier 141 for the main speaker. A further high pass filter could connect wire 134 to wire 130, if desired. The described cross connections are particularly suited to electronic organs because of the overlap of the upper manual tones with the pedal clavier tones at times.

Figure 10:
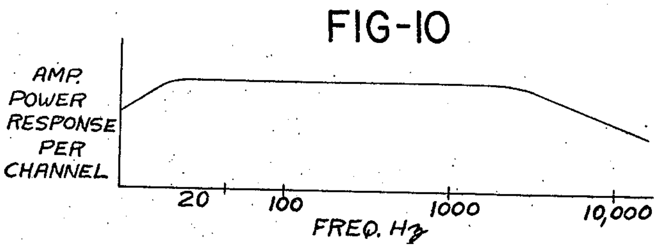
FIGURE 10 is a graph showing a frequency response of the amplifiers of the circuits of FIGURES 8 and 9.

FIGURE 10 illustrates schematically amplifier power plotted against frequency in Hz.

FIGURE 11 is drawn directly beneath FIGURE 10 and will show that the bass speaker power, indicated by the graph line 150, is at full power below the cross-over point as indicated by line 151 and drops rapidly above the cross-over point, whereas the power to the respective middle and high frequency range speakers, as indicated by the line 152, rises from a low value toward cross-over point 151 and is substantially constant thereafter toward the right of the cross-over point 151.

As mentioned, the region immediately adjacent the cross-over point 151 is of such a nature that there is no perception to the ear of the transfer of power from one speaker to the other. Since the total power output remains about the same, as the power at one speaker diminishes, the power in another speaker increases and there is no perceptible break or interruption in the region of the cross-over point.

With electronic organs, it has been found that cross-over points at about 400 c.p.s. for the main and tremulant speaker and at about 150 c.p.s. for the bass speaker produces good results. The range between the cross-over points, which may be termed a "hole," is compensated by the voicing of the organ.

It will be evident that some "cross-talk" will occur between the higher frequency speakers via the path through the lower frequency speaker. When the amplifier impedance is low, no serious problem is presented by the "cross-talk" but when the amplifier impedance is high, it may be desirable to inhibit such "cross-talk." The circuit of FIGURE 12 shows one way in which the "cross-talk" between the higher frequency speaker can be inhibited.

In FIGURE 12, the lower frequency speaker 200 has chokes 202 and 204 on opposite sides thereof with a capacitor 206 connected between one terminal of speaker 200 and ground. A resistor 208 may be in series with the capacitor, depending on its own resistance. The higher frequency speakers 210 and 212 are effectively solated from each other by the FIGURE 12 circuit, even when the amplifiers 214 and 216 have relatively high impedance. By selecting capacitor 206 and choke 202 so as to be in resonance in the range of frequencies from about 200 Hz. to 300 Hz., the "cross-talk" between speakers 210 and 212 is effectively inhibited while amplifier 214 is not overloaded in the said range of frequencies.

It will be understood that this invention is susceptible to modification in order to adapt it to different usages and conditions and, accordingly, it is desired to comprehend such modifications within this invention as may fall within the scope of the appended claims.

What is claimed is:

1. In combination in an amplifying system; a pair of amplifiers having respective inputs and outputs, a respective one of a pair of filters of a predetermined frequency range connected to the output of each amplifier, a speaker means connected to receive the output from each filter, a first source of signals different in frequency from said range, a phase splitter supplied by said source and having a pair of outputs at which output signals are developed which differ from each other in phase, each output of the phase splitters being connected to the input of a respective said amplifier, and a third speaker means and a third filter in series therewith connected between the outputs of said amplifiers, said third filter having a frequency range corresponding to the frequency of the signals from said first source of signals.

2. The combination according to claim 1 in which said output signals from said splitters are opposite in phase.

3. The combination according to claim 2 in which said output signals from said phase splitters are equal in magnitude.

4. The combination according to claim 3 in which said pair of filters are high pass filters and said third filter is a low pass filter.

5. The combination according to claim 4 which includes two second signal sources of mixed frequency, a further low pass filter fed by each said second signal source, and the outputs from said further low pass filters being connected to the input of said phase splitter and comprising said first mentioned source of signals.

6. The combination according to claim 5 in which said two second signal sources of mixed frequency comprise families of voices from the manuals of an electric organ and said first source of signals comprises voices from the pedal clavier of the organ.

7. The combination according to claim 4 which includes a recording having at least two tracks, means under the control of said tracks and having outputs at which electric signals are developed, high pass filter means connected between said outputs and the input sides of said amplifier, and low pass filter means connected between said outputs and the input side of said phase splitter.

8. The combination according to claim 4 which includes an electric organ having two manuals and a pedal clavier, voicing circuits supplied by said manuals and pedal clavier, means for combining the voices from the manuals into two families to form said two second signal sources, and the voices from said pedal clavier forming the said first source of signals.

9. The combination according to claim 1 in which said third filter is in the form of a choke coil on each side of said third speaker, and means including a capacitor connected between ground and a point near one terminal of said third speaker means whereby "cross-talk" between the first mentioned speaker means is inhibited.

10. The combination according to claim 9 in which said capacitor and one of said choke coils is resonant in the frequency range of about 200 Hz. to 300 Hz.

11. The combination according to claim 1 which includes a low pass filter connecting the input side of at least one of said amplifiers with the input side of said phase splitter.

12. The combination according to claim 11 which includes a high pass filter connecting the input side of said phase splitter with the input side of at least one of said amplifiers.

13. The combination according to claim 6 in which the signals derived from said pedal clavier are connected to the input side of at least one of said amplifiers via a high pass filter while at least one of the signals derived from said manuals is connected via a low pass filter to the input side of said phase splitter.

14. A method of producing musical sounds which comprises; developing electrical signals at frequencies corresponding to the sounds, separating the signals into first and second signals generally above a predetermined frequency and a third signal generally below said predetermined frequency, individually amplifying said first and second signals and delivering the amplified signals to respective first and second signal paths for conversion into sound, splitting said third signal into a pair of signals of equal magnitude but opposite phase, amplifying each one of said pair of signals simultaneously with a respective one of said first and second signals, and impressing the sum of said amplified pair of signals on opposite ends of a third signal path for conversion into sound independently of the conversion of said amplified first and second signals into sound.

15. A method according to claim 14 which includes blocking amplified signals below said predetermined frequency from said first and second signal paths, and blocking amplified signals above said predetermined frequency from said third signal path.

16. A method according to claim 15 which includes developing said first and second signals independently and with at least one thereof including frequencies below said predetermined frequency, and developing said third signal by extracting the frequencies below said predetermined frequency from at least said one signal.

17. A method according to claim 15 which includes developing said first and second signals independently and admixed with said third signal, extracting frequencies below said predetermined frequency from said first and second signals, and combining said extracted signals to form said third signal.

18. A method according to claim 15 which includes developing said first, second, and third signals independently, and selectively combining some of said first and second signals with each other prior to amplification thereof.

19. A method according to claim 15 which includes developing said first, second, and third signals independently, and extracting lower frequencies from at least one of said first and second signals and combining the same with said third signal, extracting higher frequencies from said third signal and combining the same with at least one of said first and second signals, and effecting said extracting and combining prior to the amplification of said signals.

20. The method according to claim 14 which includes drawing signals above a predetermined frequency to ground from a point near the center of said third signal path to inhibit transfer of signals between said first and second signal paths.

References Cited

UNITED STATES PATENTS

| | | | |
|---|---|---|---|
| 3.184.550 | 5/1965 | Rogers | 330—126 |
| 3,268,826 | 8/1966 | Harrison et al. | 330—30 |

HERMAN KARL SAALBACH, Primary Examiner

F. P. BUTLER, Assistant Examiner

U.S. Cl. X.R.

179—1; 330—124